Nov. 11, 1958 J. L. PRESLER 2,859,577
HARROW
Filed Aug. 25, 1954 2 Sheets-Sheet 1
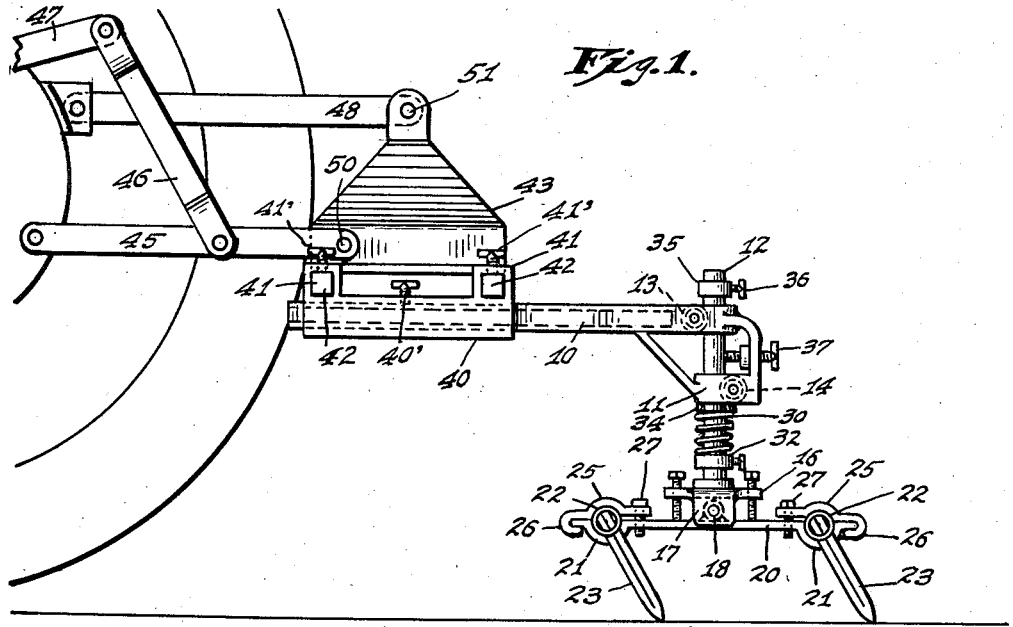
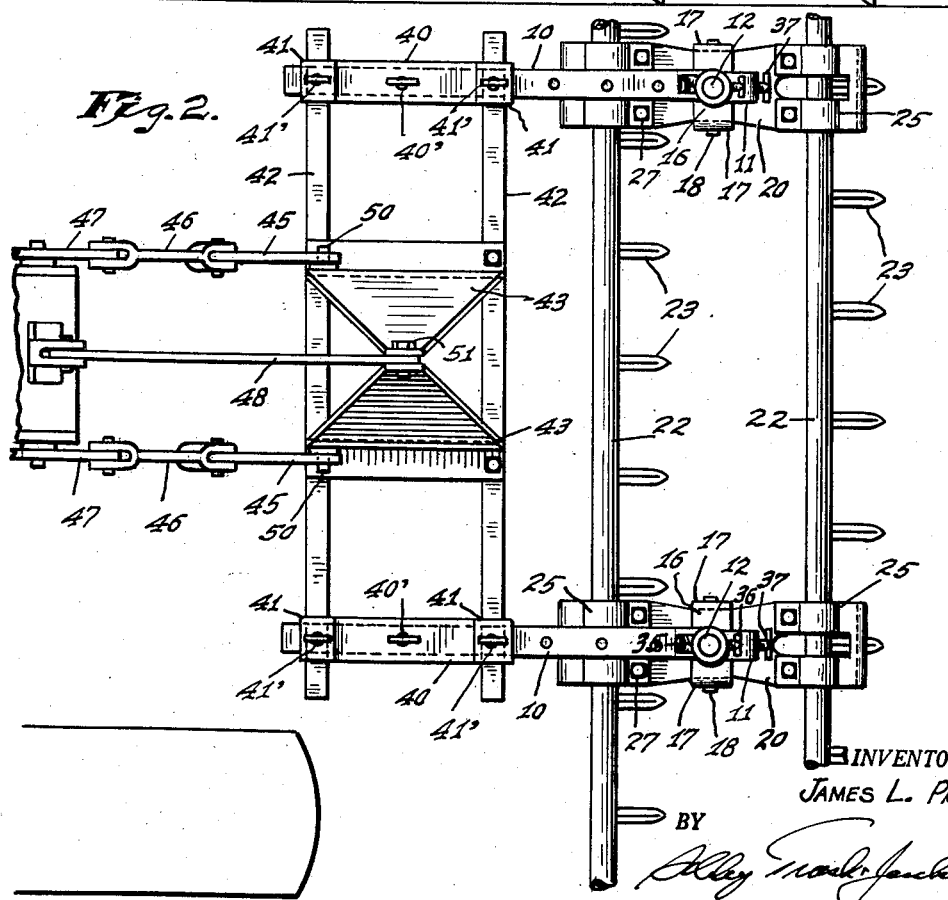
INVENTOR.
JAMES L. PRESLER,
BY
ATTORNEYS.

Nov. 11, 1958   J. L. PRESLER   2,859,577
HARROW
Filed Aug. 25, 1954   2 Sheets-Sheet 2

INVENTOR.
JAMES L. PRESLER,
BY
ATTORNEYS.

2,859,577

HARROW

James L. Presler, Van Wert, Ohio, assignor to Corson Brothers, Inc., a corporation of Indiana Application August 25, 1954, Serial No. 452,090

6 Claims. (Cl. 55—86)

It is the object of this invention to produce a toothed harrow which can be attached alternatively either directly to the power-lift mechanism of a tractor or to an earth-working implement to follow such implement as it moves over the ground.

The preferred form of my invention embodies a pair of horizontal draft bars disposed parallel to the path of harrow movement and provided at their rear ends with brackets which respectively receive two posts for free vertical sliding movement. To the lower ends of such posts I secure mounting members which support a pair of yokes for swinging movement about a horizontal axis transverse to the line of draft. Each of such yokes is provided at its front and rear ends with seats for a pair of transversely extending bars bearing harrow teeth at spaced intervals. Each seat has associated with it means for clamping its associated tooth-bearing bar at fixed position longitudinally of itself and about its axis. Surrounding each of the posts below the bracket in which it is slidable is a coiled compression spring acting between the bracket and a collar adjustably fixed to the post. Above the bracket, each post carries an adjustable collar limiting downward movement of the post in its bracket; and each bracket is provided with a clamping means which is operable to secure the post in fixed vertical position.

When the harrow is used behind another earth-working implement, the draft bars first mentioned above may be rigidly secured in any convenient manner to the frame of such implement so that the harrow will participate in all movements of the implement. For the purpose of attaching the harrow directly to the power-lift mechanism of a tractor, the draft bars may telescope into sleeves each of which is provided with a pair of spaced sockets for the reception of cross-members. The cross-members have secured to them a pair of brackets adapted for connection with the lift arms of the power-lift mechanism of a tractor. Clamp screws hold the bars in fixed position in the sleeves which respectively receive them and additional clamp screws secure the sleeves in fixed position on the cross-members.

In the accompanying drawing, which shows a preferred form of the invention,

Fig. 1 is a side elevation showing the harrow mounted on a tractor;

Fig. 2 is a plan of the arrangement shown in Fig. 1;

Figure 3:
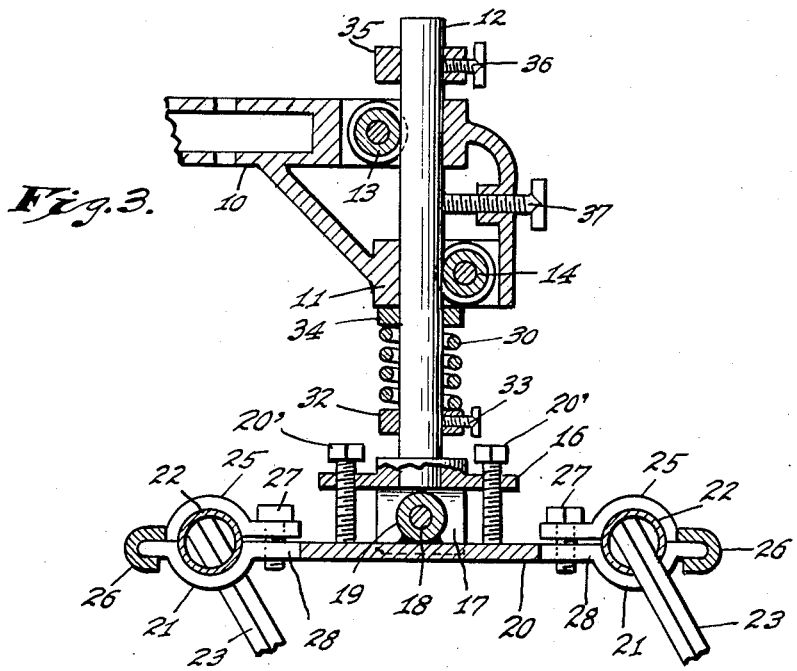
Fig. 3 is a fragmental view, similar to Fig. 1 but on a larger scale and with parts of the device broken away, showing details of construction.
Figure 4:
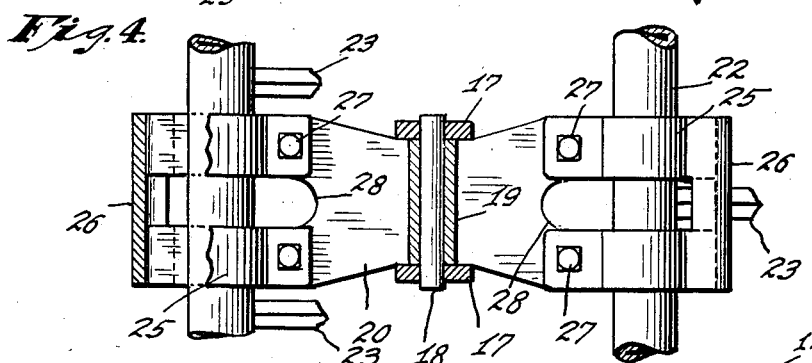
Fig. 4 is a plan, in partial section, showing the mounting for the toothed bars.

The harrow shown in the drawing comprises a pair of draft bars 10 each provided at its rear end with a bracket 11 which slidably receives a vertical post 12. Conveniently, each of the brackets 11 includes upper and lower post-engaging rollers 13 and 14, the upper roller being located in front of the post 12 and the lower roller at the rear.

To the lower end of each post there is secured a mounting member 16 having a pair of down-turned ears 17 provided with aligned openings receiving a pivot bolt 18. Between the ears 17, the pivot bolt 18 extends through a sleeve 19 secured as by welding to a yoke 20. Set-screws 20' mounted in the mounting member 16 on opposite sides of the bolt 18 engage the upper face of the yoke 20 to hold it in fixed position about the bolt-axis.

At its front and rear ends each of the yokes 20 is formed to provide an upwardly opening generally semi-circular seat 21 adapted to receive a circular bar 22 carrying a series of spaced harrow teeth 23. Associated with each of the seats 21 is a clamp member 25 formed to provide a downwardly opening seat bearing on the upper surface of the associated bar 22 and having its edge portion bent to form a lip or flange 26 embracing the adjacent end of the yoke 20. Clamp screws 27 pass through the clamp member 25 near the inner edge thereof and are screw-threadedly received in openings in the yoke 20 so that tightening of the screws will clamp the rod 22 in fixed position in the yoke 20. To multiply the possibilities of adjustment of the bars 22 longitudinally of the yokes, the ends of the yokes and the clamping members may be provided with slots 28 wide enough to receive the harrow teeth.

Surrounding each of the posts 12 below the bracket 11 is a helical compression spring 30 acting between the bracket 11 and a collar 32 which is slidable along the post 12 but which can be secured at any desired position thereon by a clamp screw 33. If desired, a collar or washer 34 may be interposed between the upper end of the spring 30 and the bracket 11.

To limit downward movement of the harrow teeth relative to the bars 10 under the influence of gravity and the spring 30 I may provide each post 12 above the bracket 11 with a second collar 35 slidable along the post but adapted to be secured thereto in any desired position by a clamp screw 36. In case it should be desired to prevent all vertical movement of the posts 12 in the brackets 11, the latter may be provided with clamp screws 37 respectively engaging the posts.

To adapt the harrow for direct mounting on the power-lift mechanism of a tractor, the arrangement illustrated in Figure 1 may be employed. There, the bars 10 are slidably received in sleeves 40 each having a pair of sockets 41 slidably receiving cross-members 42. Clamp screws 40' in the sleeves 40 locate the draft bars in such sleeves while clamp screws 41' in the sleeves locate them on the cross-members 42. To the cross-members 42 there are secured a pair of plate-like brackets 43 extending generally upwardly and adapted for attachment to the power-lift mechanism of a tractor. The power-lift mechanism shown in the drawing comprises a pair of lift arms 45 pivotally mounted on the tractor on a common horizontal axis and extending rearwardly. Such arms are connected by links 46 to power-operated cranks 47 on the tractor. A third or idler link 48 is pivotally connected to the tractor at a point above the links 45 and, like them, extends rearwardly for attachment to an implement.

The mounting brackets 43 are provided near their lower ends with outwardly projecting aligned studs 50 for reception in holes in the rear ends of the links 45. Above the studs 50, the brackets 43 converge toward each other and are provided at their upper ends with aligned openings to receive a pin or bolt 51 extending through a hole in the rear end of the link 48, which lies between the upper ends of the brackets. As will be obvious from the construction described power-operation of the cranks 47 will raise and lower the harrow as in the case of other implements to which the power-lift mechanism of the tractor is designed for attachment.

Figure 5:
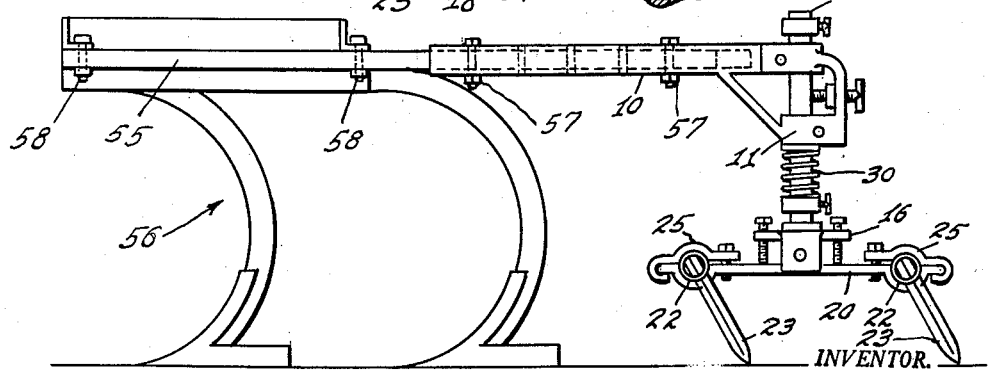
Fig. 5 is an elevation showing the manner in which the harrow may be attached to another earth-working implement.

When the harrow is to be used behind another earth-working implement, the draft bars 10 are rigidly connected to such other implement after the manner indicated in Fig. 5. Preferably, the bars 10 are tubular and telescopically receive extensions 55 which project across the frame of another implement 56 and are secured thereto in any convenient manner. To locate the extensions in the tubular draft bars, one or both of such elements may be provided with spaced holes for the reception of a bolt 57. Such holes in the draft bars 10 may receive the screws 40' of the sleeves 40 when the harrow is tractor-mounted, while the holes in the extensions 55 may be used to receive bolts 58 by which the extensions are secured to the implement 56.

The operation of the harrow is essentially the same irrespective of whether it is mounted on another implement or directly on a tractor. By loosening the clamp screws 27, the bars 22 can be rotated about their respective axes to place the teeth 23 at any desired angle relative to the ground. The relative heights of the two rows of harrow teeth can be varied by adjustment of the screws 20'. If the clamp screw 37 is loose, the harrow is free to float vertically relative to the draft bars 10 within the limits permitted by the collars 32 and 35. The rollers 13 and 14 facilitate such vertical floating of the harrow. The effective downward effort exerted on the teeth 23 by the spring 30 can be varied by adjustment of the collars 32 along the posts 12, while downward movement of the teeth relative to the draft bars is limited by the setting of the collar 35. If it is desired to maintain the harrow teeth at a fixed elevation relative to the draft bars 10 and the implement or vehicle to which the harrow is connected, the clamp screw 37 may be tightened, thus preventing vertical movement of the posts 12 in the brackets 11.

I claim as my invention:

1. In a harrow having a supporting frame structure, a pair of posts extending downwardly from and vertically slidable in said frame structure, a pair of bars each bearing harrow teeth, bar-supporting means secured to the lower ends of said posts for supporting said bars in parallel spaced relation, spring means urging said posts downwardly relative to the supporting structure, means for limiting downward movement of said posts relative to the supporting structure, and releasable means for preventing sliding of said posts in said supporting structure.

2. In a harrow having a rigid supporting frame structure, a pair of posts extending downwardly from and vertically slidable in said frame structure, and a tooth-bearing structure secured to said posts below said supporting structure, said supporting structure embodying a pair of rollers associated with each of said posts, the two rollers of each pair being mounted in fixed positions on said supporting structure and engaging the associated post on opposite sides thereof and at vertically spaced points.

3. In a harrow having a supporting frame structure, a tooth-bearing structure, draft-transmitting means on said supporting structure guiding said tooth-bearing structure for vertical movement, said supporting structure comprising a pair of forwardly projecting draft-bars each including front and rear telescopically associated elements, means for holding the two elements of each pair in any of various positions of telescopic adjustment, cross-members extending between and rigidly interconnecting the front elements of said draft bars, and provisions on said interconnecting means for connecting it to the power-lift mechanism of a tractor.

4. In a harrow having a supporting frame structure, a pair of posts extending downwardly from and vertically slidable in said frame structure, a pair of bars each bearing harrow teeth, bar-supporting means secured to the lower ends of said posts for supporting said bars in parallel spaced relation, said bar-supporting means comprising yokes pivotally attached respectively to said bars, adjustable means for securing said yokes in fixed positions of angular adjustment about such axis, spring means urging said posts downwardly relative to the supporting structure, and means for limiting downward movement of said posts relative to the supporting structure.

5. In a harrow having a supporting frame structure, a pair of posts extending downwardly from and vertically slidable in said frame structure, a pair of bars each bearing harrow teeth, bar-supporting means secured to the lower ends of said posts for supporting said bars in parallel spaced relation, said bar-supporting means comprising yokes pivotally attached respectively to said posts on a common axis parallel to and between said bars, spring means urging said posts downwardly relative to the supporting structure, and means for limiting downward movement of said posts relative to the supporting structure.

6. A harrow in accordance with claim 5 with the addition that each of said yokes is provided with seats rotatably receiving said bars, and releasable means for clamping said bars in fixed positions in said seats.

References Cited in the file of this patent

UNITED STATES PATENTS

| 48,271 | Gillies | June 20, 1865 |
| 94,623 | Lynch | Sept. 7, 1869 |
| 445,444 | French et al. | Jan. 27, 1891 |
| 615,272 | Heller | Dec. 6, 1898 |
| 902,123 | Trompeter | Oct. 27, 1908 |
| 1,065,711 | Naylor | June 24, 1913 |
| 1,729,639 | Altgelt | Oct. 1, 1929 |
| 2,336,152 | Rude | Dec. 7, 1943 |
| 2,456,693 | Fraga | Dec. 21, 1948 |
| 2,464,534 | Smith | Mar. 15, 1949 |
| 2,612,825 | Walker | Oct. 7, 1952 |
| 2,688,283 | Love | Sept. 7, 1954 |
| 2,689,514 | Ferguson | Sept. 21, 1954 |

FOREIGN PATENTS

| 62,788 | Germany | June 10, 1892 |
| 679,630 | Germany | Aug. 10, 1939 |
| 828,935 | Germany | Jan. 21, 1952 |
| 137,414 | Australia | May 29, 1950 |